Jan. 20, 1970     H. H. KLEIN     3,490,604

SAFETY HOOK FOR KNOCKDOWN RACK

Filed May 19, 1967

INVENTOR
HERBERT H. KLEIN

BY Bair, Freeman & Molinare ATTORNEYS.

United States Patent Office 3,490,604
Patented Jan. 20, 1970

3,490,604
SAFETY HOOK FOR KNOCKDOWN RACK
Herbert H. Klein, Arlington Heights, Ill., assignor to Unarco Industries, Inc., Chicago, Ill., a corporation of Illinois
Filed May 19, 1967, Ser. No. 639,694
Int. Cl. A47f 5/10
U.S. Cl. 211—177                               2 Claims

ABSTRACT OF THE DISCLOSURE

A knockdown rack is provided with an improved connecting means for connecting horizontal rails to upright supporting poles detachably and without the use of tools. The improved connecting means comprises a safety hook that will not become detached from its position of connection in the event of accidental engagement or raising of the support bar which the hook connects to the support post.

---

This invention relates to knockdown racks, and more particularly a rack of the type in which horizontal support bars, or rails, carrying connector plates are detachably secured to upright posts by wedging hook members. A construction of this type is more particularly disclosed and claimed in the patent to Franks No. 2,760,650.

Such racks are very satisfactory in commercial use in providing an extremely strong and rigid structure, but have been found to be subject to one or two minor disadvantages. One of these is that sometimes the hook members drop out during assembly thereby slowing the assembly operation. Another is that at times, during loading or unloading of a rack by a fork lift truck, the operator may accidentally engage and raise a support bar sufficiently to allow the connector plate thereon to move off of the hook or to allow the hook to drop out of place.

The present invention relates to improvements in the connecting means for knockdown racks to connect the support bars and posts which facilitates the assembly operation and prevents any accidental loss of support either during assembly or during loading or unloading of a rack. Another object is to provide a knockdown rack in which one hook portion on the hook member is made longer than the openings through which it extends, so that it must be swung or rotated into place and cannot be accidentally dislodged.

Figure 1:
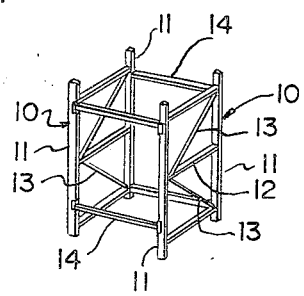
Figure 2:
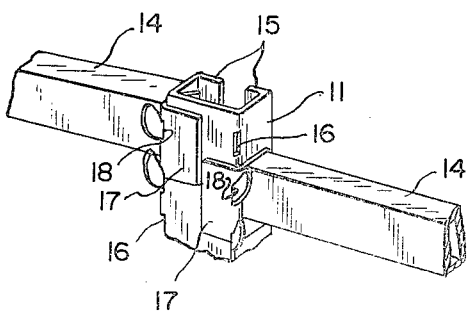
Figure 3:
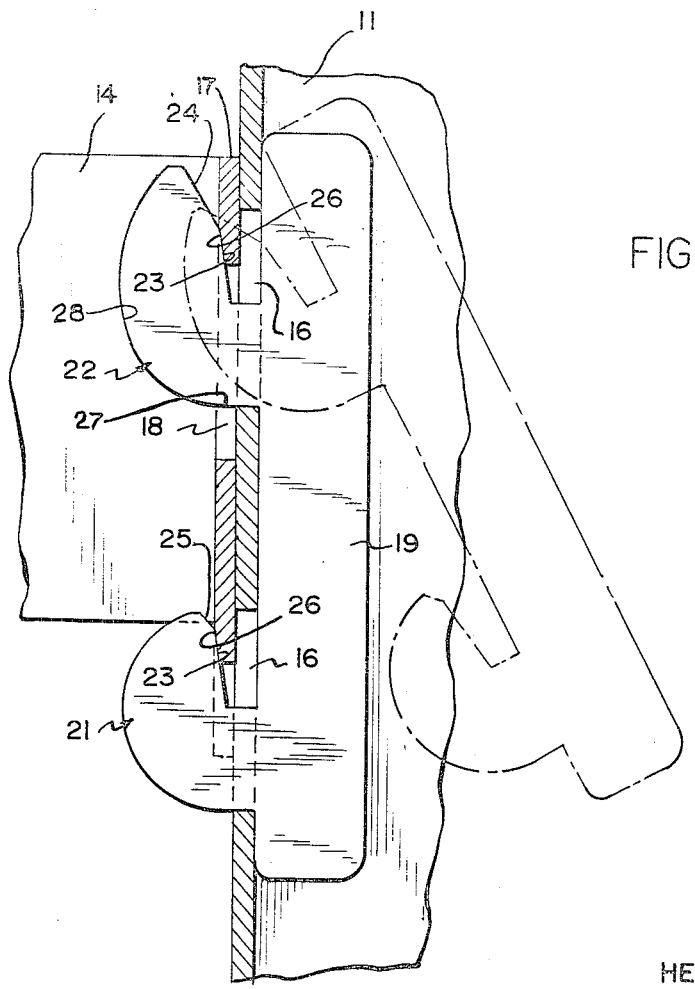

According to a feature of the invention, the longer hook portion terminates in a sharply tapered point and facilitates entry into and rotation in the openings in the post and connector plate. The above and other objects and features of the invention will be more readily apparent from the following description when read in connection with the accompanying drawing, in which:

FIGURE 1 is a perspective view of a rack unit embodying the invention;
FIGURE 2 is a partial perspective on an enlarged scale, showing the connection between horizontal support bars and upright posts; and
FIGURE 3 is a section through an assembled support bar and post illustrating the manner of insertion of the hook member.

A typical rack unit, as illustrated in FIGURE 1, is made up of two end members indicated generally at 10, each of which comprises a pair of upright posts 11, preferably formed of sheet metal of generally rectangular shape. The posts of each end member are connected by horizontal cross members 12 and diagonal braces 13 to provide a substantially rigid assembly.

To complete a rack unit, horizontal support bars 14 extend between the end members and are detachably connected thereto at their ends. It will be understood that support bars may extend in opposite directions from each end member so that a rack assembly of any desired length can be put together.

As best seen in FIGURE 2, each post 11 is formed of sheet metal of a generally channel shape with inwardly turned flanges 15 at the open side of the channel. The corners of the post, where the side flanges join the web of the channel, are formed with a series of spaced elongated openings 16 to receive hook members, as described more fully hereinafter.

Each support bar 14 is secured at its ends to connector plates 17, which are angular pieces adapted to fit over the side flanges and web of a post. The ends of the support bars 14 may be secured to the connector plates 17, as by welding. Each connector plate is formed with an opening 18 therein corresponding in size and position to the openings 16 and is preferably formed with a narrow notch at its lower edge to receive the lower hook portion of a hook member when assembled. The assembly is completed by a hook member, as best seen in FIGURE 3, which has an elongated straight shank 19 of a length to span at least two of the openings 16 in the post and which is of a size to fit easily into the hollow post. At its lower end the shank 19 carries an upwardly extending hook 21 whose vertical height is slightly less than the height of the openings 16 so that it can extend straight through an opening 16, as illustrated in FIGURE 3.

At its upper end the shank 19 is formed with a similar hook member 22, which is of a greater vertical height than the openings 16 and 18 so that it cannot be inserted straight through such openings. Each of the hook members is formed with a wedging surface 23 lying at an acute angle to and spaced from the shank 19. The wedging surface 23 of the upper hook member is mated with or engaged by the inclined or coined surface 26 defined in the connector plate 17 above the opening 18. The wedging surface 23 of the lower hook member 21 similarly engages the coined surface 26. Above the wedging surface 23 the upper hook member 22 tapers outwardly sharply, as shown at 24, to terminate in a relatively narrow point. A slight bevel, as shown at 25, may also be provided at the upper end of the lower hook member 21.

To assemble a rack according to the present invention, a support bar is placed adjacent to the post with its connector plate overlying the corner of the post, as illustrated in FIGURES 2 and 3, and with the opening 18 in the connector plate being aligned with one of the openings 16 in the post. A hook member may then be inserted in the post and tilted at an angle approximately as shown in dot-dash lines in FIGURE 3, and the upper tapered end of the upper hook portion 22 may be inserted through the aligned openings 16 and 18. The hook member may then be swung clockwise, as seen in FIGURE 3, until the lower hook portion thereon extends through the next lower openings 16 and is aligned with the notch in the lower edge of the connector plate. At this time the connector plate may be moved downwardly to substantially the position shown in FIGURE 3 to complete the connection. It will be noted that in the final assembly the upper edge of the opening 18 in the connector plate will engage the wedging surface 23 of the upper hook portion, while the upper edge of the notch in the bottom of the connector plate will similarly engage the wedging surface 23 of the lower hook portion 21. The connector plate will thus be drawn firmly against the post to form a rigid assembly therewith.

Due to the fact that the hook member must be rotated to insert it in the post and connector plate, there is no possibility that the hook member could accidentally fall out during the assembly operation. It is therefore unnecessary for the operator to hold the hook member in place, once he has positioned it, and the tapered surfaces 24 and 25 insure that the connector plate will properly engage the hook portions and be secured thereby to the post.

After the rack has been assembled, as described above, and during the use thereof, any accidental raising of a support bar cannot dislodge the bar from the hook member or release the hook member so that it could accidentally fall out of the rack. Raising of the support bar will be limited by engagement of the lower edge of the opening 18 therein with the bottom of the upper hook member 22 to a point where the upper edge of the opening 18 cannot clear the top of the hook portion 22. Therefore, the connector plate cannot move away from the hook portion accidentally nor can the hook member accidentally swing out of its assembled relationship with the post and connector plate.

The weight of the support bar 14 on the surface 23 insures a wedging action which locks the coined surface 26 in contact with the surface 23, as well as securing the shank 19 tightly against the post 11. If the support bar 14 is accidentaly raised, the connector plate opening 18 will catch on the normal hook surface 27 of the upper hook 22. Importantly, the hook surface 27 is normal to the shank 19 to prevent the lower edge of the opening 18 from sliding out and away from the shank 19 when the hook member is in operative position. Thus the surface 27 acts as a stop to prevent any tendency by the lower edge of the opening 18 to slide sideways and up along the outer curved surface 28 of the hook 22. Preferably, the normal hook surface 27 extends outwardly from and normal to the shank 19 for a distance substantially equal to the combined thicknesses of the wall of the post 11 and the connector plate 17.

The outer edge of the elongated hook 22 defines a curved surface 28 extending from the normal hook surface 27 to the tip of the elongated hook 22. The curved surface 28 is sufficiently curved to allow the elongated hook 22 of the hook member to be rotated into position through the openings 16 and 18. Because the upper hook 22 is elongated, the curvature of the curved surface 28 is critical and must be defined to allow slidable, rotatable insertion of the elongated upper hook 22 into the openings 16 and 18. The lower hook 21 is similarly curved; however, the curvature in the lower hook 21 need not be as sharp as that of the upper hook 22 for the lower hook 21 to fit through the opening 16.

While one embodiment of the invention has been shown and described in detail, it will be understood that this is for the purpose of illustration only and is not to be taken as a definition of the scope of the invention, reference being had for this purpose to the appended claims.

What is claimed is:

1. A safety hook for use with a knockdown rack that includes a hollow upright post having angularly joined sides with a plurality of vertically spaced equal-size openings therethrough at the juncture of said sides and to which a horizontal supporting member is to be connected through the medium of a connecting plate secured to the supporting member, the connecting plate being matingly related to the post in providing angularly joined sides with an opening at the juncture of the sides of the same size as an opening in the post and spaced from the lower edge of the connecting plate a distance equal to the spacing of the post's openings; said safety hook comprising, in combination: an elongated straight shank of a length to span at least two openings in the post, a pair of vertically spaced hooks on the shank each having a connection portion extending normal to the shank and an elongated point portion spaced from the shank and providing thereon a wedging surface facing and spaced from but inclined relative to the straight shank, corresponding lower edges on the connection portions of the hooks being parallel to each other and spaced apart a distance equal to the spacing of the post's openings, the said lower edge on the uppermost hook providing a length segment, substantially equal to the combined thickness of the wall of the post and connecting plate, which is normal to the shank, said point portions of the hooks being adapted to point upwardly when serving to attach a connecting plate to the post, the uppermost of the pair of point portions of the hooks being longer than the size of the opening in the post so that said uppermost point portion must first be angled to introduce said point portion through a pair of aligned openings in the post and a connecting plate, the outermost edge of the uppermost point, between said normal length segment of said lower edge of the connection portion and the distal tip of the point, being rounded so as to permit swinging of the elongated shank to a position where the lower point passes through an aperture in the post and the post is then engaged by the shank along its length, and there being a second inclined surface on the uppermost hook tip that is inclined at a greater angle than the wedging surface for narrowing the distal end of the hook tip.

2. A device as in claim 1 wherein the outermost surface of the lower of the two hooks includes said lower edge portion normal to the shank for engaging the bottom edge of the aperture in the sheet metal part through which it is to extend, and a curved portion between the straight portion and the distal tip of the hook; and the point portion of the lower hook including a second inclined surfaec at the distal end of the lowermost hook tip that is inclined at a greater angle than the wedging surface.

References Cited

UNITED STATES PATENTS

| 2,815,130 | 12/1957 | Franks | 211—148 |
| 1,820,716 | 8/1931 | Vance | 108—109 |
| 2,778,505 | 1/1957 | Levitt | 248—243 XR |

FOREIGN PATENTS

| 9,363 | 4/1901 | Norway. |

ROY D. FRAZIER, Primary Examiner

A. FRANKEL, Assistant Examiner

U.S. Cl. X.R.

211—148; 248—243